United States Patent [19]
Webb

[11] Patent Number: 5,820,166
[45] Date of Patent: Oct. 13, 1998

[54] HOSE CLAMP WITH POSITIONING DEVICE

[75] Inventor: Scott D. Webb, Murfreesboro, Tenn.

[73] Assignee: ACD Tridon Inc., Burlington, Canada

[21] Appl. No.: 613,257

[22] Filed: Mar. 8, 1996

[51] Int. Cl.⁶ .................................................. F16L 33/02
[52] U.S. Cl. .............................. 285/23; 24/20 R; 24/205; 285/252; 285/242
[58] Field of Search ............................. 285/23, 337, 365, 285/252, 253, 242; 24/20 R, 274 R, 20 TT, 20 CW, 20 S, 456, 20 EF

[56] References Cited

U.S. PATENT DOCUMENTS

| | | | |
|---|---|---|---|
| 3,365,218 | 1/1968 | Denyes | 285/253 |
| 3,463,517 | 8/1969 | Courtot et al. | 285/253 |
| 4,135,744 | 1/1979 | Fouts | 285/253 |
| 4,882,814 | 11/1989 | Takahashi et al. | 24/20 |
| 5,145,218 | 9/1992 | Worley et al. | 285/243 |
| 5,234,233 | 8/1993 | Fix | 285/23 |
| 5,388,872 | 2/1995 | Campo et al. | 285/253 |
| 5,456,784 | 10/1995 | Cogdill et al. | 285/253 |
| 5,620,209 | 4/1997 | Sauer | 285/252 |

FOREIGN PATENT DOCUMENTS

| | | |
|---|---|---|
| 2630808 | 4/1988 | France . |
| 3543717 | 6/1987 | Germany . |

*Primary Examiner*—Eric K. Nicholson
*Attorney, Agent, or Firm*—Rogers & Scott

[57] ABSTRACT

The invention provides a positioning device engaged loosely on a prestressed hose clamp to locate and orientate the hose clamp on a hose. The device is adapted to engage about the clamp and has inwardly facing pegs which serve both to locate the device loosely on the clamp and to engage the hose to bias the clamp into engagement with the hose thereby holding the clamp orthogonally with respect to the hose.

20 Claims, 2 Drawing Sheets

HOSE CLAMP WITH POSITIONING DEVICE

FIELD OF THE INVENTION

This invention relates to securing deformable hoses on rigid cylindrical fittings such as those found in automobile engines. More particularly the invention relates to a positioning device to locate and orientate an expanded prestressed hose clamp on a hose ready to release the clamp to apply a radial compressive force on the hose.

BACKGROUND OF THE INVENTION

Hose clamps have been designed in a great variety of forms which fall into three general types. A first of these types is a continuous band which includes an upstanding portion or "ear" which can be deformed after assembly to tension the band around a hose. Such clamps are sometimes referred to as Oetiker clamps after the name of the inventor. The clamps are engaged on a hose by using a special tool to deform the ear and thereby apply a compressive radial stress on the hose.

A second type of clamp includes a mechanical actuator, such as a worm screw, acting directly on a band to bring the band into firm engagement with the hose. Lastly, the third type is a clamp of spring steel made to have a diameter slightly less than that of the outside diameter of the hose, so that when the clamp is deformed to enlarge the clamp, there will be stored energy in the clamp useful to apply a compressive radial force to hold the clamp on the hose.

It has become common practice in automobile applications to use parts which minimize the work done on the assembly line. For this reason the prestressed spring steel clamp has been developed in a variety of forms. One of these forms which has found considerable acceptance consists of a clamp which is first enlarged at the point of manufacture and held in this condition by a keeper in the form of a clip which holds the clamp in the enlarged prestressed condition. Typically, the clamp is then placed on a hose and glued in position at a point diametrically opposite the clip so that on the automobile assembly line the hose is put in place and the clip pulled off the clamp using a tool designed for the purpose.

The use of adhesive to hold the open clamp in position on the hose presents a number of difficulties. Firstly the use of adhesive tends to be undesirable simply because of the inherent problems of handling and applying the adhesive. Also, and possibly more importantly, if the clamp has to be replaced for any reason when maintaining a vehicle, the clamp has to be released from the hose or the hose must be replaced together with the clamps.

For these reasons it is desirable to provide an alternative approach to locating clamps on hoses such that adhesive is not required and such that the replacement of clamps is not impeded.

One approach to providing location for a prestressed clamp on a hose is found in U.S. Pat. No. 4,882,814. This patent teaches the use of a retaining plate engaged inside the clamp to urge the clamp into engagement with the hose at a point diametrically opposite a retaining clip. Such a structure will result in an uneven distribution of radial stress when deployed on the hose due to the discontinuities where the ends of the retaining plate are located. These discontinuities are not normally acceptable in pressurized systems such as those used in automobiles.

The same patent teaches another approach. The clip used to retain the clamp in a stressed condition is extended beyond the sides of the clamp to bear down on the hose thereby aligning and locating the clamp. This structure also presents difficulties because the reactive load on the clip will tend to strip it prematurely.

U.S. Pat. No. 5,234,233 teaches another approach to providing a clamp and hose assembly. This patent demonstrates a series of rubber bands which, when applied around a clamp, tend to locate and orientate the clamp on a hose. These bands must be attached to the hose clamp, probably after the clamp has been placed on the hose. The structures taught in the patent would require considerable dexterity to assemble and are therefore not desirable structures.

Accordingly, it is an object of the present invention to provide a device which can be used to locate a prestressed hose clamp on a hose and which will not interfere with the normal use of the hose clamp during initial assembly or when replacement is necessary.

SUMMARY OF THE INVENTION

In one of its aspects the invention provides a positioning device engaged loosely on a prestressed hose clamp to locate and orientate the hose clamp on a hose. The device is adapted to engage about the clamp and has inwardly facing pegs which serve both to locate the device loosely on the clamp and to engage the hose to bias the clamp into engagement with the hose thereby holding the clamp orthogonally with respect to the hose.

In another of its aspects the invention provides an assembly of a hose and a clamp with the clamp located on the hose about the clamp. Pegs on the device prevent separation of the device from the clamp and engage the hose to orientate and locate the clamp.

BRIEF DESCRIPTION OF THE DRAWINGS

The invention will be better understood with reference to the following description taken in combination with the accompanying drawings, in which.

DESCRIPTION OF THE PREFERRED EMBODIMENTS

Figure 1:
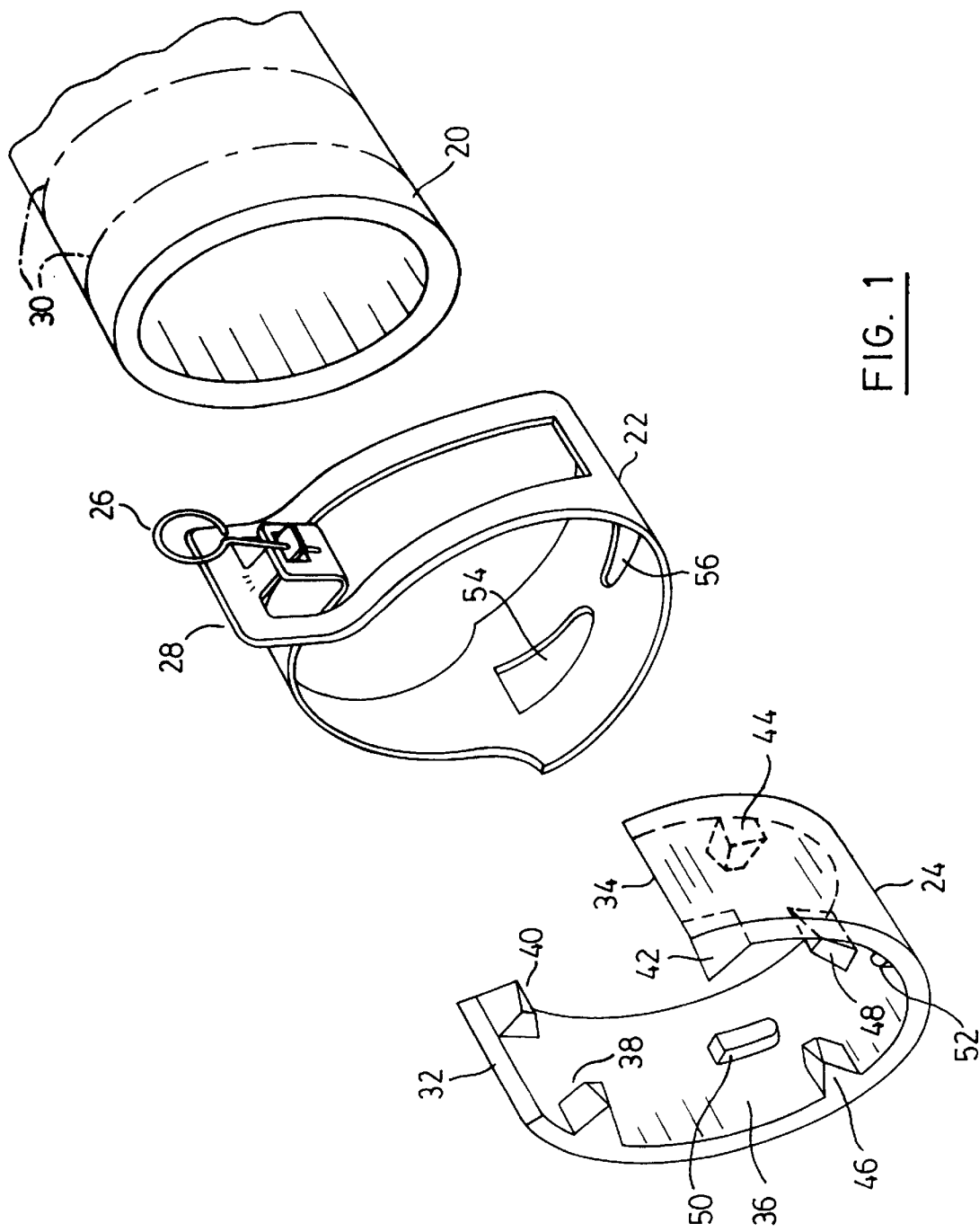
FIG. 1 is an isometric view of a generally cylindrical hose clamp ready for installation on a deformable hose and showing a positioning device according to the invention ready for assembly on the hose clamp.

Reference is first made to FIG. 1 which illustrates an exemplary deformable hose 20 of the type used in automobile cooling systems, a pre-stressed hose clamp 22 proportioned for use on the hose, and a generally cylindrical positioning device 24 which, as will be explained, is provided to position and orientate the clamp 22 on the hose 20 prior to deployment of the clamp.

It will be evident that the clamp 22 (which is an exemplary design representing many similar clamps) is essentially a band in a pre-stressed condition and held in the pre-stressed position by a release element in the form of a pin 26 engaged in a clamp release structure 28. This structure holds the clamp in the expanded position shown in FIG.

1 giving it proportions to allow it to be slipped loosely over the hose 20. The clamp is deployed in the position indicated generally by chain-dotted lines 30 on the hose 20 by pulling the pin 26 and allowing the energy stored in the clamp to reduce the diameter of the clamp about the hose 20. Of course this deployment would take place when the hose is engaged over a boss of the kind found on automobile radiators etc.

The purpose of the positioning device 24 is to ensure that when the clamp 22 is on the hose, the clamp is orientated generally orthogonally with respect to the axis of the cylindrical hose to ensure that when it is deployed it will apply the maximum radial compressive load on the hose.

The positioning device 24 is generally cylindrical and is C-shaped terminating at ends 32, 34 which define a gap proportioned to provide clearance on assembly for the clamp release structure 28, both as shown in and after deployment. The device 24 defines a C-shaped curved wall 36 between the ends 32, 34 which, as will be explained, is proportioned to engage the clamp and force the clamp into a preferred orientation on the hose.

The wall 36 supports integral inwardly projecting pegs or projections arranged as a first pair 38, 40 adjacent the end 32 of the device; a second pair 42, 44 adjacent the other end 34 of the device, and a central pair 46, 48 positioned generally centrally of the device, i.e. spaced generally equally between the first and second pairs of pegs.

The wall also supports a pair of stubs 50, 52 proportioned and positioned to engage in openings 54, 56 in the clamp 22. As will become evident, each of the pairs of pegs is arranged so that one of the pegs in a particular pair is off-set circumferentially with regard to the other peg in order to simplify moulding the device using injection moulding techniques. Further details of the structure will be explained with reference to FIGS. 2 and 3.

Figure 2:
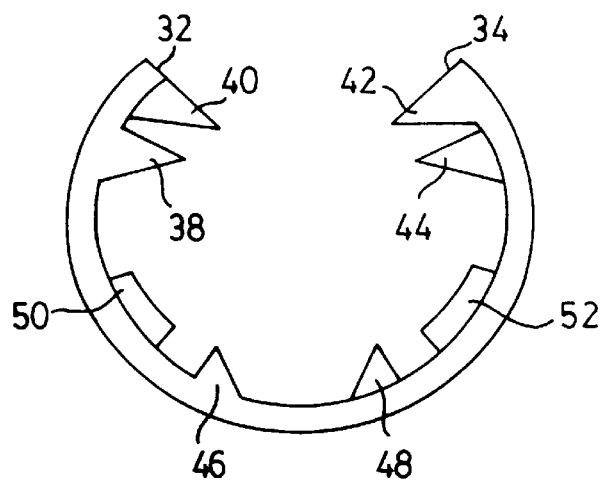
FIG. 2 is a end view of the device and illustrating the positions of inwardly extending pegs.

Reference is next made to FIG. 2 which is an end view of the positioning device 24 illustrating the relative positions of the pegs and stubs. It will be seen that the first pair of pegs 38, 40 are similar in appearance to the pegs 42, 44 with the pegs 40, 42 being positioned adjacent the respective ends 32, 34 and the pegs 38, 44 being displaced circumferentially for moulding purposes (as was mentioned earlier). The central pegs 46, 48 are smaller than the other pegs but radially greater than the stubs 50, 52 which are used simply for location.

Figure 3:
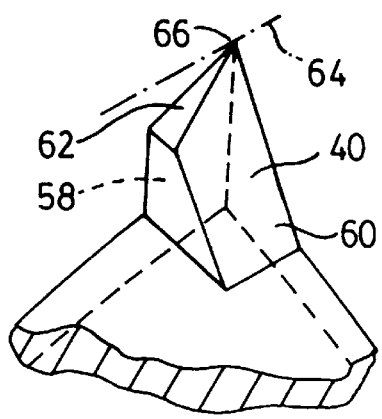
FIG. 3 is a perspective view of one of the pegs on the device and drawn to a larger scale.

Each of the pegs has a shape for positive engagement with the hose. As is common in the art, hoses are quite irregular on the surface and consequently a positive engagement is best achieved by the use of a small contact area such as that achieved by a point, small pad or restricted line. As seen in FIG. 3, the peg 40 (which is typical in shape of all of the pegs) consist of a radial face 58 and an inclined face 60 which extends at about 45 degrees with respect to radius of the device. An angled outer face 62 is created by a plane extending at about 30 degrees to chain-dotted line 64 drawn parallel to the cylindrical axis of the device. The result is that the outer face 62 is triangular and extends generally outwardly from an apex 66 at the distal end towards the axis of the device. As a result the apex stands proud from the peg for point engagement with the hose. Consequently, each of the pegs provides a point contact with the hose at the apex of the individual pegs. Also, because the apex is on the outer extremity of the device, the spacing between the apices in pairs of pegs is as large as possible.

The apices of the pegs are arranged so that when the device 24 is deflected outwardly, the apices define a circle of the same diameter as that of the outside diameter of the hose. As will be explained, the stored energy resulting from this deformation ensures that the apices apply locating and positioning forces at points on the hose.

Figure 4:
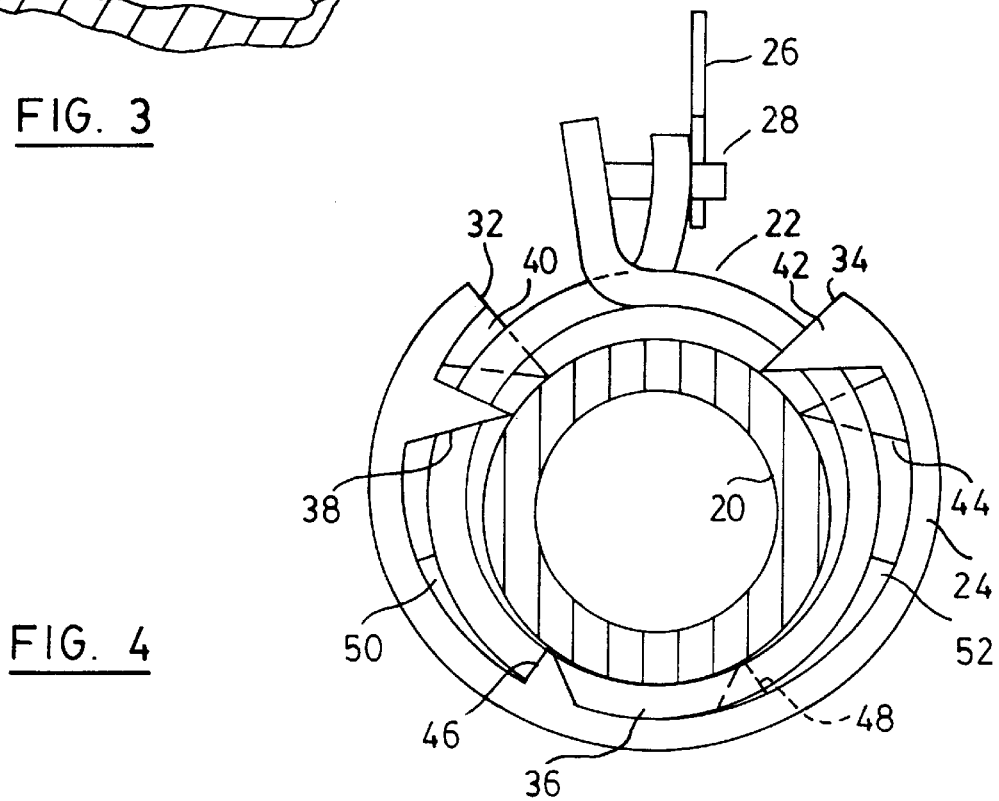
FIG. 4 is an end view of the device drawn to a larger scale than that used in FIG. 2 and assembled on the clamp which in turn is positioned on a deformable hose.

Reference is next made to FIG. 4 which illustrates the assembly of the parts shown in FIG. 1. The hose clamp 22 has been positioned on the hose 20 using the positioning device 24 for location. The device 24 is resilient with sufficient flexibility to allow it to be snapped over the hose clamp either before or after the hose clamp has been prestressed into the position ready for deployment shown in FIG. 4. It should also be noted that the proportions of the device 24 are such that the gap between the ends 32, 34 will accommodate the clamp release structure 28 after deployment of the clamp.

The main features of FIG. 4 are the proportions of the parts. It will be seen that the device 24 is positioned so that the various pegs previously described engage the hose 20 and the device is stressed sufficiently to cause a small compressive stress. The result is an upward force (as drawn) applied by the device 24 to the clamp 22 and a reactive force at the pegs causing the pegs to grip the hose.

The central pegs 46, 48 have lengths sufficient to meet the hose to resist movement on the hose, but not sufficient to prevent the clamp being sandwiched between the device and the hose.

By contrast, the pairs of pegs 38, 40 and 42, 44 are longer to provide a positive engagement on the hose. The length of these longer pegs ensures that there is space between the wall 36 and the clamp to permit movement of the device to apply load to the hose under the influence of energy stored in the device as a result of outward deflection necessary to engage the device on the hose. This outward deflection can be achieved in any convenient manner such as providing a thin tapered guide placed over the end of the hose for sliding the preassembled clamp and positioning device onto the hose.

Once in position on the hose, the positioning device applies forces which automatically create an orthogonal arrangement of the clamp on the hose to ensure that when the pin 26 is removed to release the structure 28, the energy in the clamp is released to cause the clamp to take an orthogonal deployed position on the hose. The device 24 will not interfere with this and will remain in position. Of course it will not interfere should it become desirable to release the clamp and remove it from the hose.

The positioning device 24 has a number of advantages. First of all it can be preassembled on the hose clamp 22 before the clamp is pre-stressed and remains in place throughout the use of the clamp should it be necessary to remove the clamp, and the device will not interfere with the removal procedure used to remove the clamp.

The embodiment of positioning device shown can be varied. One such variation is to omit the central pegs 46, 48 in situations where the assembly is stable and located by the forces in the assembly and the engagement of the first and second pairs of pegs on the hose. Similarly the location stubs may be omitted and the band 36 can be varied in cross-section and width consistent with providing sufficient material to store the required energy when the device is deflected into position for engagement with the hose.

Another variation within the scope of the invention is to change the shape, position or number of pegs. Although such variations must be done without affecting the functional operation of the device, it will be evident that many arrangements of pegs can be used within the scope of the invention as claimed.

It will be evident that although the invention has been described in use with an exemplary hose clamp, it can be used with any clamp having similar characteristics. Minor modifications may be necessary to accommodate a particular clamp and such modifications are within the scope of the invention as claimed.

I claim:

1. A positioning device for use to restrain a pre-stressed hose clamp in a preferred location on a deformable hose with the clamp positioned orthogonally with respect to the hose, the device comprising:

a C-shaped wall extending between ends defining a gap between the ends;

first and second pairs of pegs attached to the C-shaped wall adjacent respective said ends of the wall, the pegs of each pair of pegs spaced from one another to receive a clamp between the pegs and having a length to engage the hose with the clamp between the pegs;

the positioning device being resiliently deformed on engagement on the hose whereby with the clamp around the hose and between pegs of each pair of pegs, the pegs engage the hose firmly and the device sandwiches the clamp at a location diametrically opposite said gap between the device and the hose to align the clamp orthogonally with respect to the hose.

2. A positioning device as claimed in claim 1 in which the pegs terminate at distal ends in apices for engaging the hose by point contact.

3. A positioning device as claimed in claim 1 and further comprising a pair of central pegs positioned opposite said gap and spaced one from the other to receive the clamp between the central pegs.

4. A positioning device as claimed in claim 3 in which the central pegs are longer than the thickness of the clamp sufficient only to engage the hose with the clamp sandwiched between the hose and the device.

5. A positioning device as claimed in claim 3 in which the central pegs terminate at distal ends in apices for engaging the hose by point contact.

6. A positioning device as claimed in claim 3 in which the pegs in each of said pair of pegs are offset circumferentially of said wall with respect to one another to facilitate making the device using injection moulding techniques.

7. An assembly of a hose clamp and a positioning device for retaining and positioning the clamp at a selected location on a deformable hose and useful to clamp the hose in place, the hose clamp being pre-stressed in an open condition and including: a clamp release structure and a release element removably coupled to the release structure for removal to release the energy stored in the clamp to apply a radial compressive stress to the hose, and the positioning device including: a C-shaped wall having ends defining a gap between the ends with said clamp release structure positioned between the ends; first and second pairs of pegs attached to the C-shaped wall adjacent respective said ends of the wall, the pegs of each pair of pegs spaced from one another with the clamp between the pegs and having a length to engage the hose with the clamp between the pegs; and the positioning device being proportioned to be resiliently deformed when engaged on the hose whereby with the clamp around the hose and between pegs of each pair of pegs, the pegs engage the hose firmly and the device sandwiches the clamp between the device and the hose to align the clamp orthogonally with respect to the hose.

8. An assembly as claimed in claim 7 in which the pegs terminate at distal ends in apices for engaging the hose by point contact.

9. An assembly as claimed in claim 7 and further comprising a pair of central pegs positioned opposite said gap and spaced one from the other to receive the clamp between the central pegs.

10. An assembly as claimed in claim 9 in which the central pegs are longer than the thickness of the clamp sufficient only to engage the hose with the clamp sandwiched between the hose and the device.

11. An assembly as claimed in claim 9 in which the central pegs terminate at distal ends in apices for engaging the hose by point contact.

12. An assembly as claimed in claim 9 in which the pegs in each of said pair of pegs are offset circumferentially of said wall with respect to one another to facilitate making the device using injection moulding techniques.

13. In an assembly of a pre-stressed hose clamp on a hose, the clamp being of the type which includes a band which is pre-stressed into a size to slide loosely on the hose, and having a clamp release structure operable to release energy stored in the clamp to apply a radial compressive stress on the hose, and the clamp being positioned and orientated by location means, the improvement in which the location means comprises: a C-shaped positioning device of a resilient material and including a curved wall having ends; the wall extending about said band and having ends spaced to form a gap containing the clamp release structure and providing clearance to permit said release structure to be released, the device further including pegs to either side of said band adjacent said ends and extending radially inwards, the pegs being in engagement with the hose and the device being stressed to provide restoring energy to engage the pegs against the hose and to sandwich the band of the clamp between the device and the hose at a location diametrically opposite the clamp release structure.

14. In an assembly as claimed in claim 1, the further improvement in which the pegs terminate at distal ends in apices for engaging the hose by point contact.

15. In an assembly as claimed in claim 1, the further improvement in which the device further includes central pegs positioned generally opposite said gap and spaced to either side of said band.

16. An assembly useful for making connections in fluid circuits, the assembly comprising:

a deformable hose having an end to be engaged over a rigid cylindrical tubular element;

a pre-stressed hose clamp positioned loosely on the hose at a location for use to apply a radial stress on the hose, the clamp having a band and clamp release structure; and a positioning device of a resilient material and including a curved wall having ends; the wall extending about said band and having ends spaced to form a gap containing the clamp release structure and providing clearance to permit said release structure to be released, the device further including pegs to either side of said band adjacent said ends and extending radially inwards, the pegs being in engagement with the hose and the device being stressed to provide restoring energy to engage the pegs against the hose and to sandwich the band of the clamp between the device and the hose at a location diametrically opposite the clamp release structure.

17. An assembly as claimed in claim 16 in which the positioning device further comprises a pair of central pegs positioned opposite said gap and spaced one from the other to receive the clamp between the central pegs.

18. An assembly as claimed in claim 17 in which the central pegs are longer than the thickness of the clamp sufficient only to engage the hose with the clamp sandwiched between the hose and the device.

19. A positioning device for use to restrain a pre-stressed hose clamp in a preferred location on a deformable hose with the clamp positioned orthogonally on the hose the device comprising: a C-shaped band having a curved wall including ends defining a gap to accommodate a release structure on the clamp; pegs attached to the curved wall adjacent said ends of the curved wall, the pegs being positioned to receive the clamp with pegs to either side of the clamp adjacent both of said ends, the pegs being of a length to engage the hose with the clamp between the pegs; and the positioning device being resiliently deformable and proportioned to be deformed to enlarge said gap whereby when the device contains a clamp on the hose the pegs will be positively engaged on the hose and the clamp will be sandwiched between the device and the hose at a location between said ends of the device and opposite said gap.

20. A positioning device as claimed in claim 19 in which each of the pegs terminates at a distal end in an apex for point contact with the hose.

\* \* \* \* \*